(12) United States Patent
van Rotterdam et al.

(10) Patent No.: US 10,248,316 B1
(45) Date of Patent: Apr. 2, 2019

(54) METHOD TO PASS APPLICATION KNOWLEDGE TO A STORAGE ARRAY AND OPTIMIZE BLOCK LEVEL OPERATIONS

(71) Applicant: EMC Corporation, Hopkinton, MA (US)

(72) Inventors: Jeroen Mattijs van Rotterdam, Berkeley, CA (US); Michael T. Mohen, Millington, MD (US); David Humby, Ontario (CA); Vinod Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 215 days.

(21) Appl. No.: 14/871,280

(22) Filed: Sep. 30, 2015

(51) Int. Cl.
*G06F 3/06* (2006.01)

(52) U.S. Cl.
CPC .......... *G06F 3/0604* (2013.01); *G06F 3/0659* (2013.01); *G06F 3/0673* (2013.01)

(58) Field of Classification Search
CPC ..... G06F 3/0604; G06F 3/0659; G06F 3/0673
See application file for complete search history.

(56) References Cited

U.S. PATENT DOCUMENTS

| | | | | |
|---|---|---|---|---|
| 2007/0226320 A1* | 9/2007 | Hager | ............... | G06F 17/30194 709/219 |
| 2009/0249198 A1* | 10/2009 | Davis | .................... | G06F 17/276 715/261 |
| 2014/0181474 A1* | 6/2014 | Gewirtz | ................ | G06F 9/3004 712/206 |
| 2016/0062694 A1* | 3/2016 | Makkar | ................. | G06F 3/0629 711/111 |
| 2017/0006320 A1* | 1/2017 | Beattie, Jr. | ......... | H04N 21/2187 |
| 2017/0041393 A1* | 2/2017 | Mortazavi | ........... | H04L 67/1097 |
| 2017/0116433 A1* | 4/2017 | Erofeev | ............... | G06F 21/6218 |

OTHER PUBLICATIONS

"Database." Hargrave's Communications Dictionary, Wiley, Frank Hargrave, Wiley, 1st edition, 2001. Credo Reference.*

* cited by examiner

Primary Examiner — Ryan Bertram
(74) Attorney, Agent, or Firm — Chamberlain, Hrdlicka, White, Williams, & Aughtry (57) ABSTRACT

A method and system for writing data, including receiving a request to store a file, where the request has context information. The method further includes generating a metadata portion based on the context information, dividing the file into a plurality of data portions, generating a plurality of blocks where each of the plurality of blocks has the metadata portion and one of the plurality of data portions, and storing the plurality of blocks in a storage array.

19 Claims, 10 Drawing Sheets

METHOD TO PASS APPLICATION KNOWLEDGE TO A STORAGE ARRAY AND OPTIMIZE BLOCK LEVEL OPERATIONS

BACKGROUND

Significant amounts of content (e.g., documents, records, images, audio-visual content) are stored on computing systems. Traditional approaches to managing this large amount of content consumes large amounts overhead.

DETAILED DESCRIPTION

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology relate to tiered storage systems (also referred to as storage layers). More specifically, one or more embodiments of the technology relate to passing context information from application or content management layers to a storage layer. In other words, in one or more embodiments, metadata may be generated from the context information and stored with its corresponding blocks to allow the one or more storage controllers more granular control over stored data. In this manner, the one or more storage controllers in a system may (proactively) perform actions on stored data (See e.g. FIGS. 3-4 and 6-7C) based upon the context information that is passed to them and stored as metadata.

Figure 1:
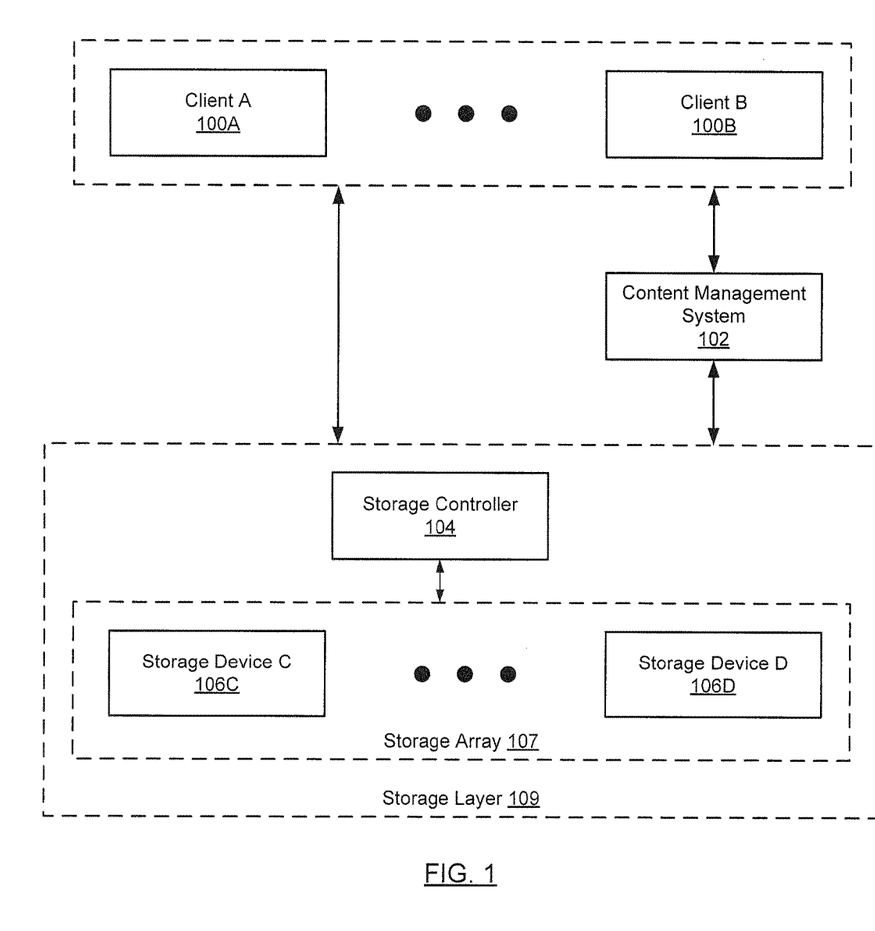
FIG. 1 shows an example system in accordance with one or more embodiments of the technology.

FIG. 1 shows an example system in accordance with one or more embodiments of the technology.

As shown in FIG. 1, the system includes one or more clients (100A-100B), a content management system (102), and a storage layer (109) having a storage controller (104) and storage devices (106C-106D) within a storage array (107). Each of these components is described below.

In one or more embodiments of the technology, a client (100A-100B) may be any computer system or process executing on a computer system that issues a read or write request to the storage layer. Furthermore, in one or more embodiments the clients (100A-100B) may issue read or write requests (also referred to as queries) to the content management system (102). In one embodiment of the technology, the clients (100A, 100B) may each include a processor (not shown), memory (not shown), and persistent storage (not shown). In one embodiment of the technology, the clients may be implemented using computing devices shown in FIG. 8.

In one or more embodiments of the technology, the content management system (102) may be any computer system or process executing on a computer system that allows publishing, storing, querying, editing, organizing, maintaining, and deleting content that is stored in a storage layer. In one or more embodiments, the content management system (102) may be a database. In other words, in one or more embodiments of the technology, the content management system (102) may be implemented to facilitate interfacing between the clients (100A-100B) and the storage layer.

In one embodiments of the technology, the content may correspond to any type of structured and/or unstructured data that may be stored in the storage layer. Examples of content may include, but are not limited to, text files, audio files, image files, database records, and/or audio-visual files.

In one or more embodiments of the technology, the storage layer (109) has a storage controller (104) and a storage array having one or more storage devices (106C-106D). In one or more embodiments, the storage layer may have multiple storage controllers (104) each controlling one or more storage arrays.

In one or more embodiments, the storage controller (104) includes functionality to read blocks that include data and metadata, from the storage array (See e.g. FIGS. 2A-2B and 4-5). In one or more embodiments, the storage controller includes functionality to write blocks, including generating metadata from context information, to the storage array (See e.g. FIG. 3). In one or more embodiments, the storage controller includes functionality to implement actions on blocks based on, for example, the aforementioned metadata (See e.g. FIGS. 6-7C).

In one or more embodiments, the storage controller (104) may include compliance rules. In one or more embodiments, a compliance rule specifies: (i) a requestor, (ii) a corresponding content metadata (See e.g. FIG. 2B), and (iii) a rule to apply when conditions (i)-(ii) are satisfied. For example, a compliance rule may pertain to the origin of the request from a client having a particular set of restrictions. Alternatively, a compliance rule may relate to the sensitivity level of the data itself. For further discussion of additional examples of metadata that may be used to implement compliance rules see, for example, FIG. 2B below.

In one embodiment of the technology, the storage controller (104) includes a processor (not shown) configured to execute instructions to implement one or more embodiments of the technology, where the instructions are stored on a non-transitory computer readable medium (not shown) that is located within or that is operatively connected to the storage controller (104). Alternatively, the storage controller (104) may be implemented using hardware. Those skilled in the art will appreciate that the storage controller (104) may be implemented using any combination of software and/or hardware.

In one embodiment of the technology, the storage controller (104) is operatively connected to memory (not shown). The memory (now shown) may be any volatile memory including, but not limited to, Dynamic Random-Access Memory (DRAM), Synchronous DRAM, SDR SDRAM, and DDR SDRAM. In one embodiment of the technology, the memory (not shown) is configured to temporarily store various data (including, but not limited to, context information, metadata, and parity data) prior to such data being stored in the storage array.

In one embodiment of the technology, the storage array includes one or more storage devices (106C-106D) (SDDs). Each storage device (106C-106D) includes persistent storage media. Examples of storage devices include, but are not limited to, magnetic memory devices, optical memory devices, phase change memory devices, solid state memory devices, tape drives, any other suitable type of persistent memory device, or any combination thereof.

In one or more embodiments, the clients (100A-100B) are connected to the storage layer and/or the content management system via a network. The network may be wired network, a wireless network, or any combination thereof. Further, the network may be a wide area network (e.g., the Internet) or a local area network (LAN).

Figure 2A:
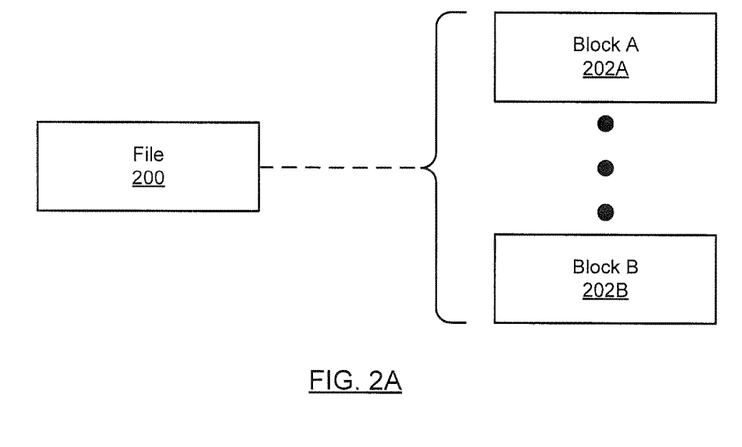
FIG. 2A shows an example of a file and block relationship in accordance with one or more embodiments of the technology.

FIG. 2A shows an example of a file and block relationship in accordance with one or more embodiments of the technology.

In one embodiment of the technology, storage layer may receive data (along with corresponding metadata) from the clients and/or content management system or the storage layer in the form of a file. The storage layer may subsequently store this data as a series of blocks (202A, 202B). Accordingly, each such received file (200) may be divided into blocks that are subsequently stored in physical locations within the storage array.

Figure 2B:
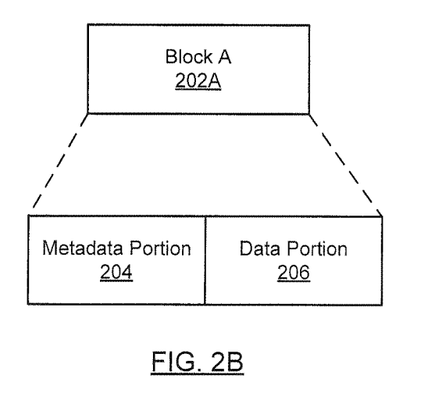
FIG. 2B shows an example of a block, metadata portion, and data portion in accordance with one or more embodiments of the technology.

With reference to FIG. 2B, each block (202A) includes a metadata portion (204) and a data portion (206). The metadata portion may include content metadata and context metadata. The content metadata includes information about how and when the data was stored, while the context metadata includes information related to what the data represents, how the data has been used, and/or how the data may be used. Examples of content metadata may include, but is not limited to, timestamps, and error correction codes. Examples of context metadata may include, but are not limited to, data type, a security level, a bandwidth priority, a historical data utilization (i.e. a counter for number of accesses), a predicated data utilization, encryption requirements, user information, read/write access levels (i.e. read-only data that cannot be modified or deleted), data shredding requirements (i.e., the level of data shredding that should be performed), and a data expiration time (i.e., when the data should be deleted from the storage array).

While FIGS. 1-2B shows a configuration of components, other configurations may be used without departing from the scope of the technology. For example, various components may be combined to create a single component. As another example, the functionality performed by a single component may be performed by two or more components.

Further, while FIG. 1 shows a single storage controller per storage layer, each layer may have multiple storage controllers. Further, each storage layer may have multiple storage arrays.

While the various steps in the following flowcharts are presented and described sequentially, one of ordinary skill will appreciate that some or all of the steps may be executed in different orders, may be combined or omitted, and some or all of the steps may be executed in parallel.

Figure 3:
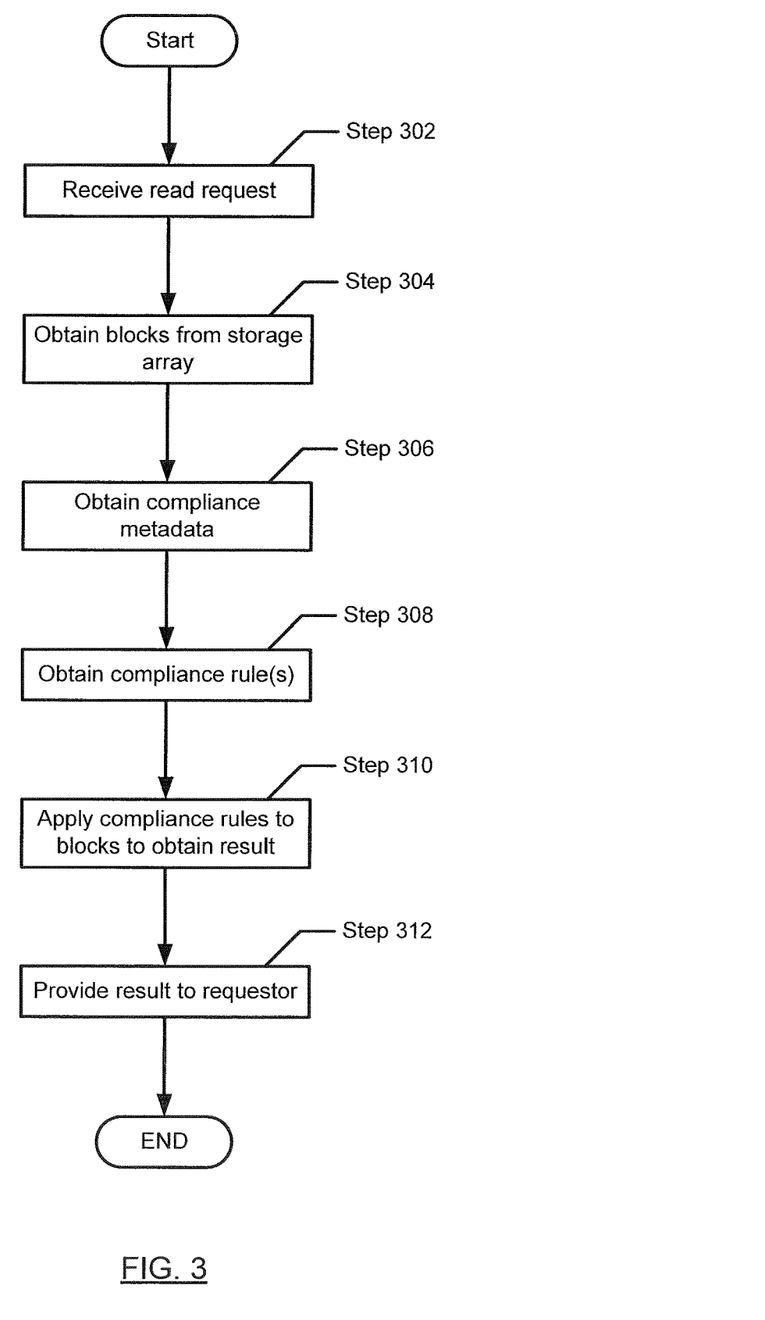
FIG. 3 shows an example method for servicing read requests in accordance with one or more embodiments of the technology.

FIG. 3 shows an example method for servicing read requests in accordance with one or more embodiments of the technology. More specifically, the example method shown in FIG. 3 details how blocks (i.e., the blocks shown in FIG. 2A-2B) may be read from the storage layer.

Turning to FIG. 3, in step 302, the storage controller (See e.g. FIG. 1, 104) receives a read request from a requestor. In one or more embodiments, the requestor may be, for example, a client or a content management system. In one or more embodiments, the request may include logical address that the storage controller may use to identify the appropriate block(s) in the storage array.

In step 304, the storage controller processes the request and obtains the requested blocks from the storage array.

In step 306, the storage controller extracts context metadata from the requested blocks. More specifically, the storage controller may include functionality to obtain the content metadata from the retrieved blocks.

In step 308, the storage controller obtains any compliance rules related to the requestor and the content metadata (See e.g. FIG. 1, 104). More specifically, as discussed above, the storage controller may implement access and/or compliance rules at the block level using the context metadata. Said another way, instead of the compliance rules being implemented by the content management system or another entity, the storage controller may use the context metadata stored in the block in order to apply the compliance rules on a per block basis.

In step 310, the storage controller then applies the compliance rules on a per block basis to create a compliant result. The complaint result may only include the blocks that may be read by the requestor. In step 312, the storage controller provides the compliant result to the requestor.

The following section describes various examples in accordance with one or more embodiments of the technology. The examples are not intended to limit the scope of the technology.

Figure 4:
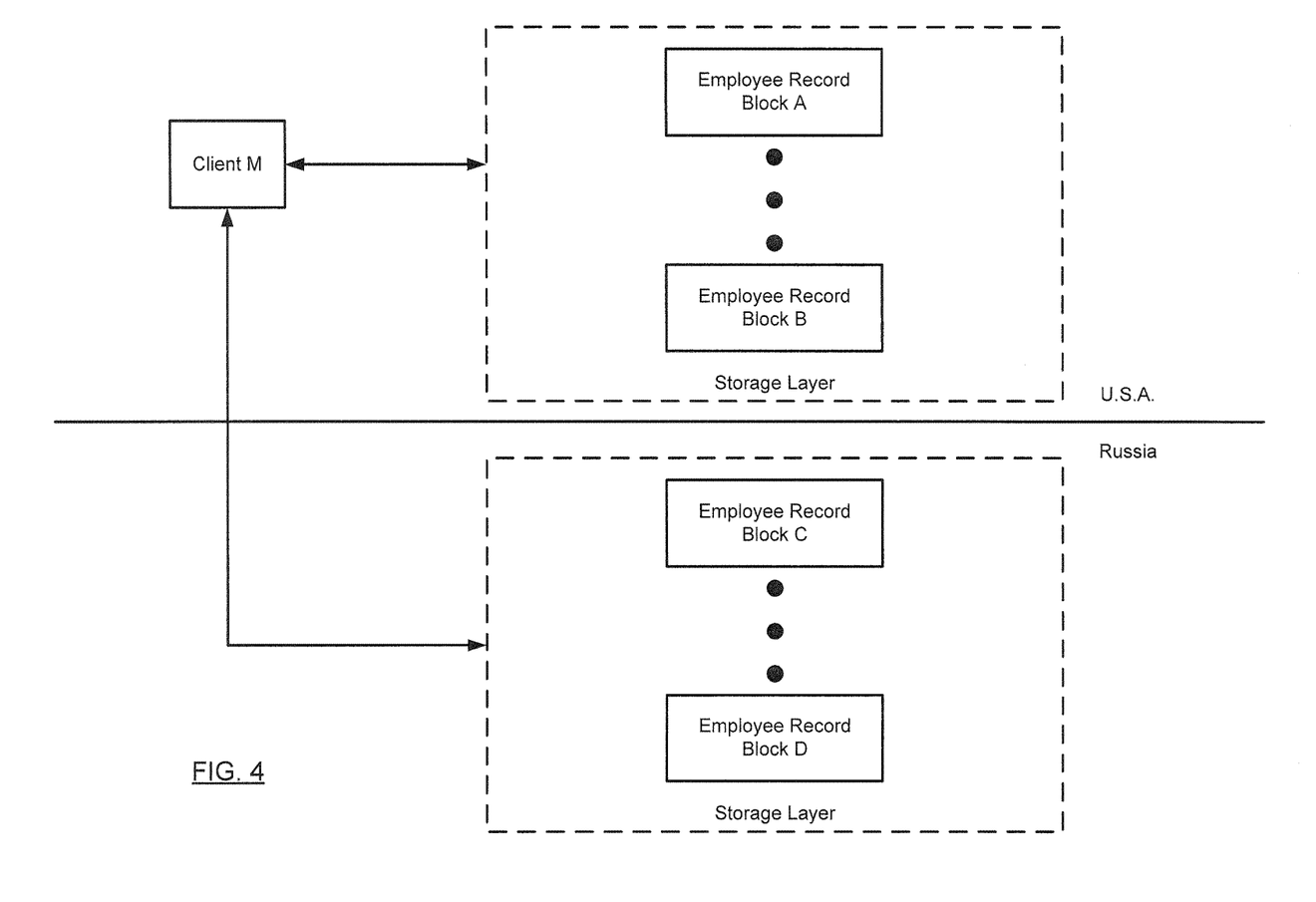
FIG. 4 shows an example in accordance with one or more embodiments of the technology.

FIG. 4 shows an example in accordance with one or more embodiments of the technology.

Turning to the example, consider a scenario where data is globally distributed between two geographic locations: the U.S.A. and Russia. Thus, in one or more embodiments in accordance with FIG. 4 there is a storage layer in the U.S.A. having employee records (Employee Record A-Employee Record B) and a storage layer in Russia having employee records (Employee Record C-Employee Record D). In one or more embodiments, the employee records are stored in one or more storage devices within a storage array in the storage layer (See e.g. FIG. 1, 106C-106D). Further, consider a client (Client M) located in the U.S.A. that issues read requests to each of the storage layers.

Turning to the request to the U.S.A. storage layer, the storage controller in the U.S.A. (See e.g. FIG. 1, 104) receives the request and obtains the blocks from a storage array. The storage controller also obtains from the blocks any context metadata. The storage controller obtains any compliance rules related to the requestor (Client M) or the data. For the purposes of this example, assume that the content metadata indicates that the blocks include data for employees in the U.S.A. and that the compliance rule indicates that requestors from the U.S.A. may access employee records of employees in the U.S.A. Accordingly, because Client M is in the U.S.A., the storage controller provides obtained blocks and provides the blocks to Client M.

Turning to the request to the Russia storage layer, the storage controller in Russia (See e.g. FIG. 1, 104) receives the request and obtains the blocks from a storage array. The storage controller also obtains from the blocks any content metadata. The storage controller obtains any compliance rules related to the requestor (Client M) or the data. For the purposes of this example, assume that the content metadata indicates that the blocks include data for employees in the Russia and that the compliance rule indicates that requestors outside of Russia cannot access employee records of employees in Russia. Because Client M is located outside of the Russian jurisdiction, storage controller denies the requestor access to the requested blocks.

By encoding context information on a per block basis, the compliance rules may be enforced by the storage controller without requiring any processing of the data stored in the block (i.e., data stored in the data portion). Further, by implementing compliance rules at the block level, it is more difficult to circumvent the compliance rules.

Figure 5:
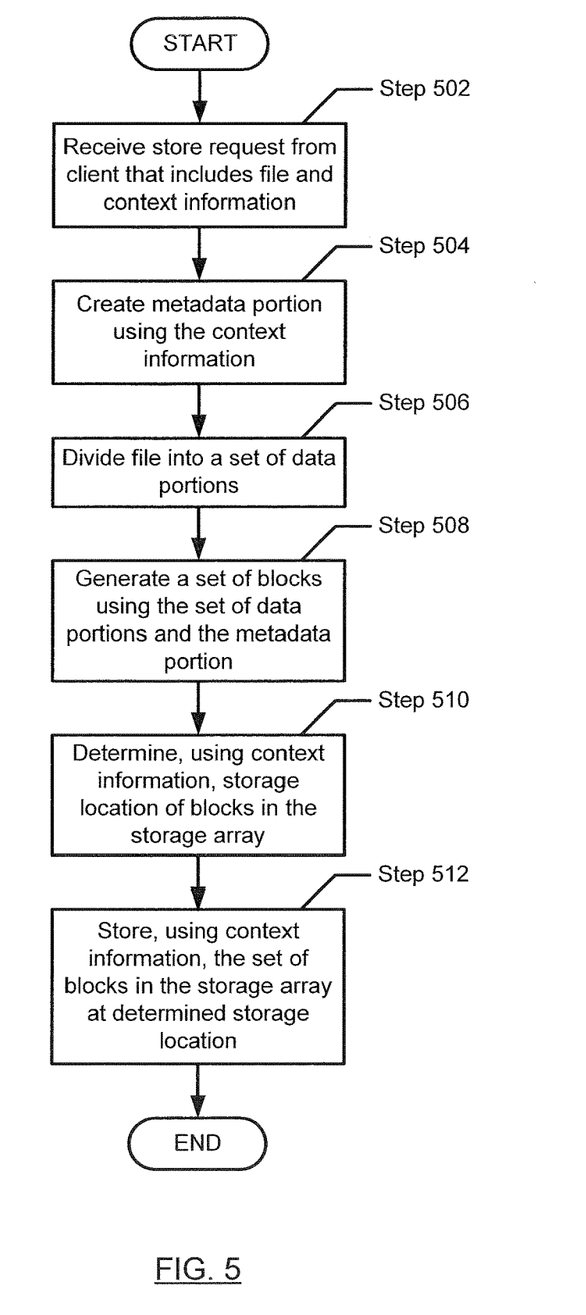
FIG. 5 shows an example method for storing blocks in accordance with one or more embodiments of the technology.

As discussed above, the storage controller includes functionality to receive files from the clients and/or the content management system and then to store each of these files as a series of blocks. FIG. 5 shows an example method for storing blocks in accordance with one or more embodiments of the technology.

In step 502, the storage controller receives a request to store data (i.e., a write request). In one or more embodiments the request may originate from a client or from a content management system. Furthermore, in one or more embodiments the request may include a file (See e.g. FIG. 2A) and context information.

In step 504, the storage controller creates a metadata portion (See e.g. FIG. 2B) using the context information. The creation of the metadata portion may include encoding all or a portion of the context information provided in the request.

If the request is provided by the client, then the context information may correspond to context information that is provided by the client. If the request is provided by the content management system, then the request may include context information from the client and/or context information from the content management server.

In step 506, the storage controller divides the file into a set of data portions. In step 508, the storage controller generates a set of blocks using the set of data portions and the metadata portion (See e.g. FIGS. 2A-2B). More specifically, each block that is associated with the file includes a unique data portion and the same metadata portion (i.e., the same metadata portion is used by all the blocks).

In step 510, the storage controller makes a determination using the context information about the storage location for the set of blocks in the storage array. As discussed above, in one or more embodiments, context metadata may indicate that data is high priority data. Accordingly, based on the context information, the blocks may be stored in higher bandwidth or higher availability (lower access latency) storage devices or storage arrays. Additionally, in one or more embodiments, the context information may indicate that a particular set of blocks corresponds to archived records. In such cases, the storage controller may store the set of blocks in lower bandwidth (or higher access latency) storage devices or storage arrays. In other embodiments of the technology, the context information may not be used to initially store the blocks in the storage array.

Figure 6:
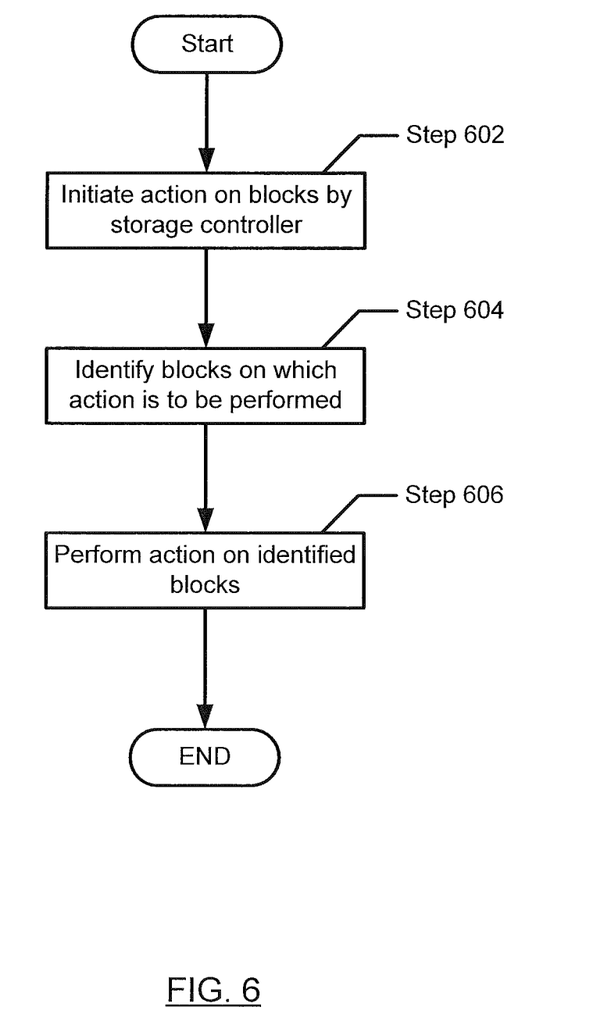
FIG. 6 shows an example method for initiating an action on blocks in accordance with one or more embodiments of the technology.

FIG. 6 shows an example method for initiating an action on blocks in accordance with one or more embodiments of the technology.

In step 602, the storage controller (See e.g. FIG. 1, 104) initiates an action on one or more blocks in a storage array. In one or more embodiments, the storage controller may receive a request to perform an action from a client or content management system. In one or more embodiments, the storage controller may initiate an action on its own, for example, based upon internal conditions including, but not limited to timers, interrupts, or thresholds (e.g. data or bandwidth utilization).

In one or more embodiments, the action may include context information specifying the types of blocks that the action is to be performed on. In other words, the action includes sufficient context information to determine the corresponding metadata stored in the blocks (i.e. CI="context information"). (See e.g. FIG. 2B, metadata portion). For example, the action may specify blocks within a particular date range or older than a specified date (e.g. CI=expiration_date). In another example, the action may be for a particular type of data (e.g. CI=employee_record). In yet another example, the action may be for particular priority level of data (e.g. CI=low or CI=high). In another example, the action may be for blocks that have passed a threshold for a number of accesses indicating that they are in high demand (CI=accesses>threshold).

In step 604, the storage controller uses the context information obtained in step 602 to identify blocks on which the action is to be performed. In other words, in one or more embodiments, the storage controller obtains all of the blocks having metadata matching the context information specified by the action.

In step 606, the storage controller performs the action on the set of identified blocks. For example, if the action specified a utilization threshold (i.e. CI=accesses>threshold), then the storage controller moves the blocks identified in step 604 from a lower bandwidth storage array (or device) to a higher bandwidth storage array (or device). Alternatively, in one or more embodiments, if the action specified an expiration date, the storage controller may delete the blocks identified in step 604. Further, in one or more embodiments, storage controller may also determine that the selected blocks include context information set in the metadata portion that specify that these blocks is to be digitally shredded in the event that the block is to be deleted. Alternatively, in one or more embodiments, the storage controller may determine that the selected blocks include context information, set in the metadata portion, that specify that these blocks are read-only and, as such, are not to be deleted.

In one or more alternative embodiments, instead of first identifying all blocks on which to perform the action and then performing the action, the storage controller may scan all the blocks in a storage device (or any portion thereof) and/or storage array (or any portion thereof). In such scenarios, if during the scan a block is identified that includes context information, then the storage controller may perform the action on that block prior to identifying a next block to scan.

The following section describes an example in accordance with one or more embodiments of the technology. The example is not intended to limit the scope of the technology.

Figure 7A:
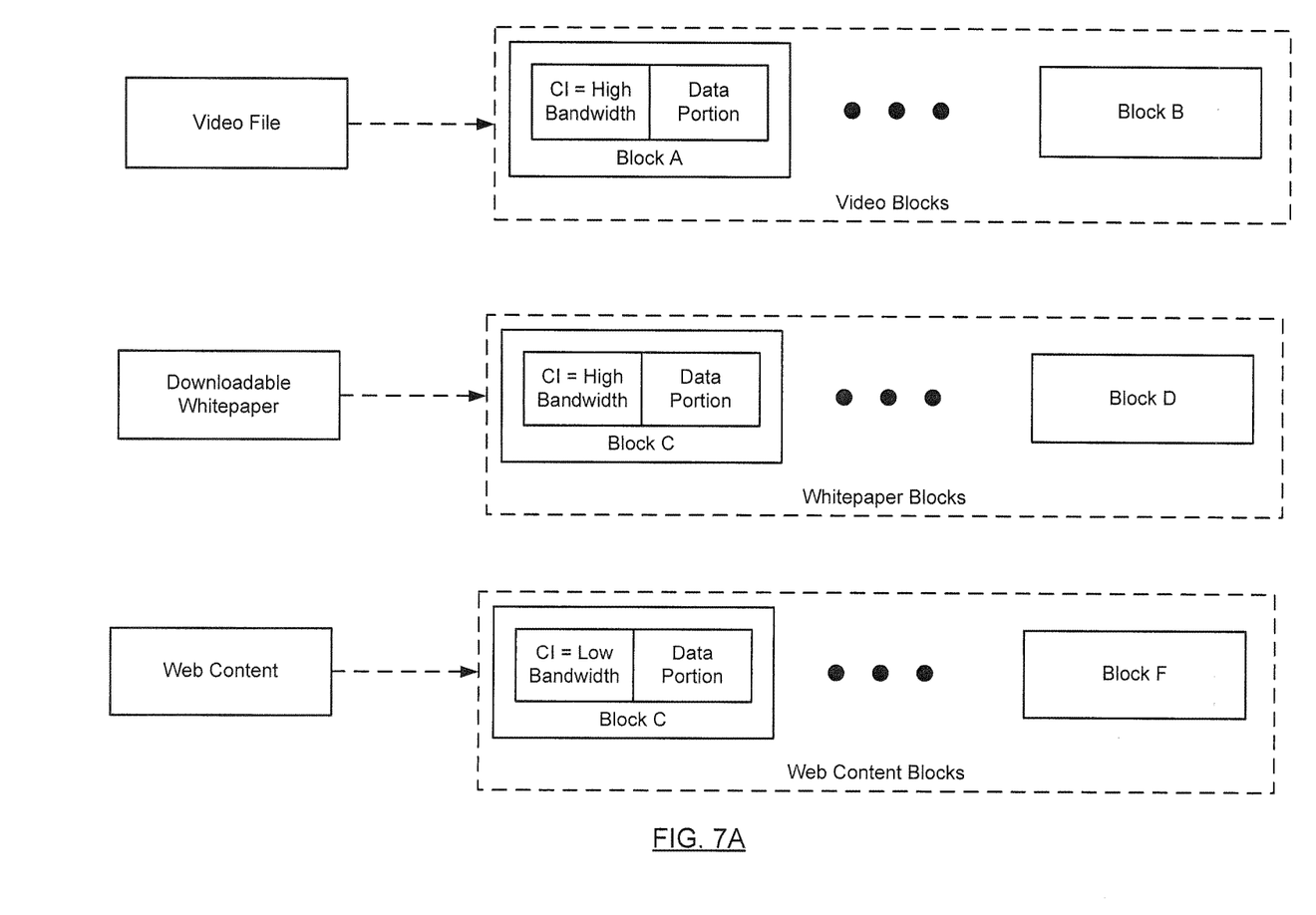
FIG. 7A shows an example in accordance with one or more embodiments of the technology.

FIG. 7A shows an example in accordance with one or more embodiments of the technology.

Turning to FIG. 7A, consider a scenario in which a client stores a (i) Video File (e.g. a streaming video), (ii) a Downloadable Whitepaper (e.g. a txt or pdf file), and (iii) Web Content (e.g. one or more webpages) into a storage layer (See e.g. FIG. 1). As it stores each of (i)-(iii), the client also includes context information for each of the files. More specifically, the client indicates via context information that the Video File and the Downloadable Whitepaper have high bandwidth priorities. Further, the client indicates via context information that the Web Content has a low bandwidth priority.

In one or more embodiments, a storage controller (See e.g. FIG. 1, 104) generates metadata based on the context information for the Video File indicating that high bandwidth is required (i.e. CI=High Bandwidth). In order to store the file, the storage controller creates Video Blocks by dividing the Video File into data block portions (see e.g., 2A-2B), creating a metadata portion that includes context information, and then combining each of the data block portions with the metadata portion to create a set of video blocks.

In one or more embodiments, a storage controller (See e.g. FIG. 1, 104) generates metadata based on the context information for the Downloadable Whitepaper indicating that high bandwidth is required (i.e. CI=High Bandwidth). In order to store the file, the storage controller creates Whitepaper Blocks by dividing the Downloadable Whitepaper into data block portions (see e.g., 2A-2B), creating a metadata portion that includes context information, and then combining each of the data block portions with the metadata portion to create a set of Whitepaper Blocks.

In one or more embodiments, a storage controller (See e.g. FIG. 1, 104) generates metadata based on the context information for the Web Content indicating that low bandwidth is required (i.e. CI=Low Bandwidth). In order to store the file, the storage controller creates Web Content Blocks by dividing the Web Content into data block portions (see e.g., 2A-2B), creating a metadata portion that includes context information, and then combining each of the data block portions with the metadata portion to create a set of Web Content Blocks.

Figure 7B:
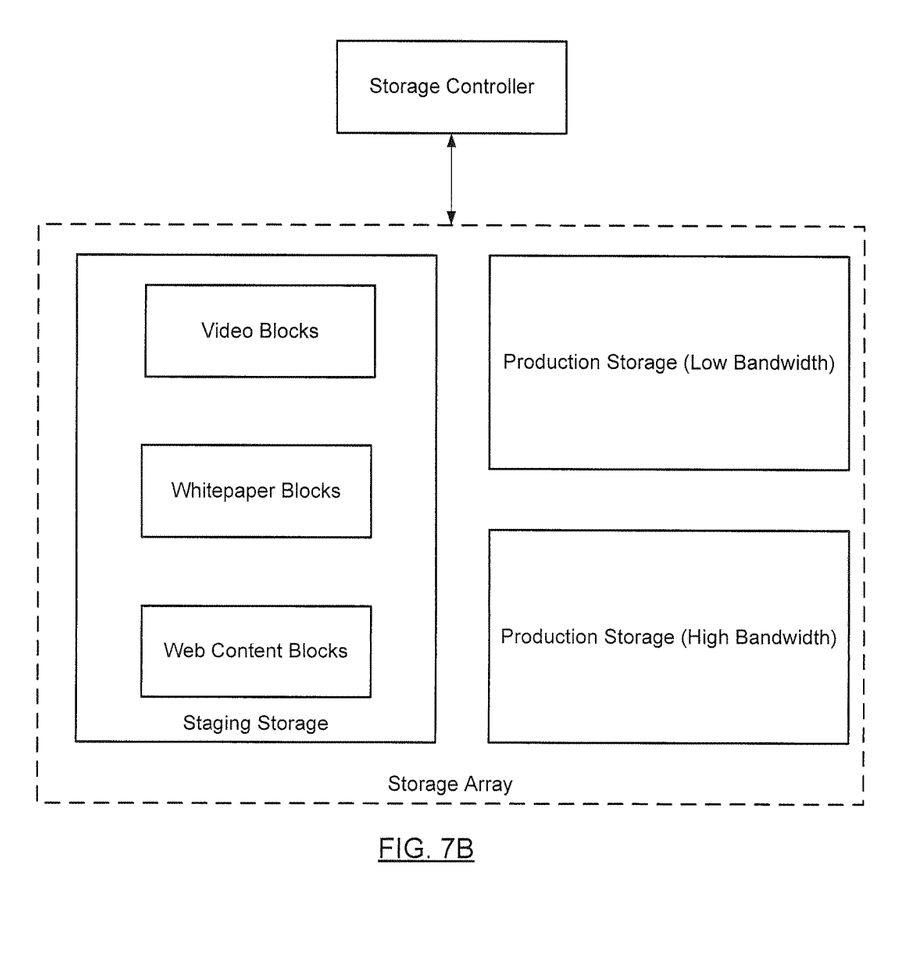
FIG. 7B shows an example in accordance with one or more embodiments of the technology.

FIG. 7B shows an example in accordance with one or more embodiments of the technology.

Continuing from FIG. 7A, consider a scenario in which the client has indicated that the Video File, the Downloadable Whitepaper, and the Web Content are not to be published until a given date (i.e. after a public conference). Thus, in one or more embodiments in accordance with FIG. 7B, the storage controller stores the Video Blocks, the Whitepaper Blocks, and the Web Content Blocks in a Staging Storage array.

Figure 7C:
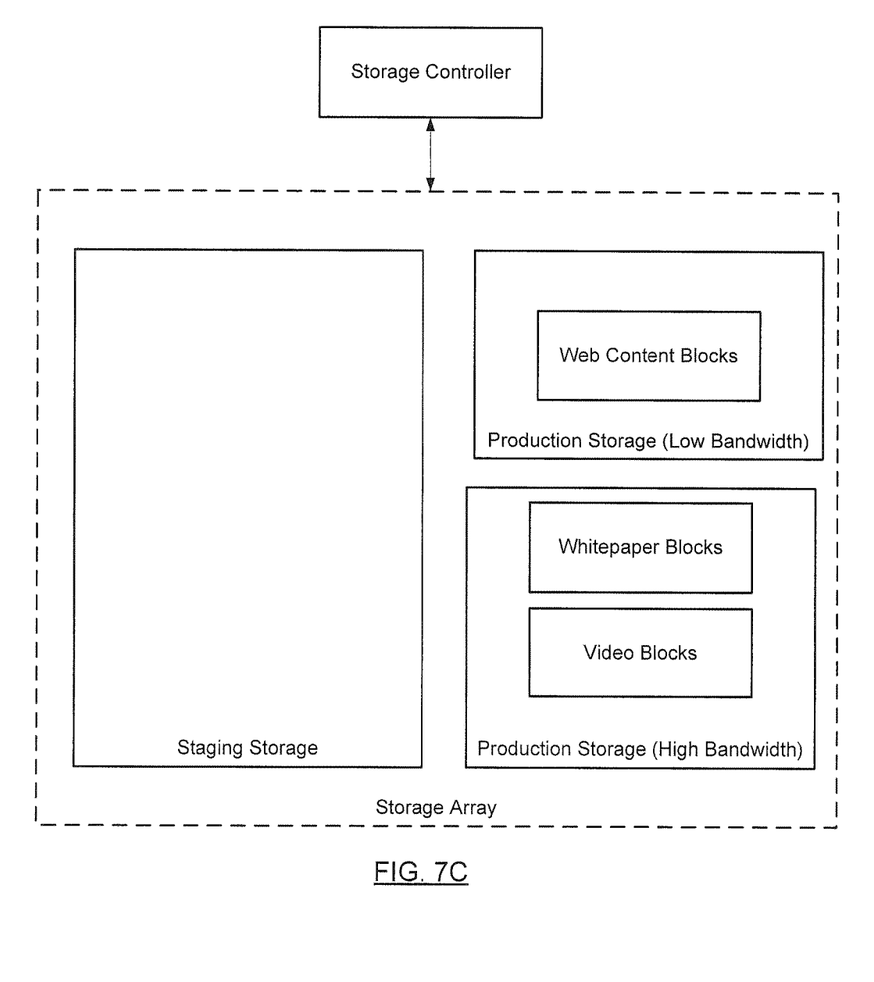
FIG. 7C shows an example in accordance with one or more embodiments of the technology.

FIG. 7C shows an example in accordance with one or more embodiments of the technology.

Continuing from FIG. 7B, consider a scenario in which the public conference date indicated by the client in FIG. 7C has been reached. Thus, in one or more embodiments in accordance with FIG. 7C, the client or storage controller initiates one or more actions (See e.g. FIG. 6) to migrate the blocks from the staging storage to the appropriate production storage. As discussed above, the Video Blocks and the Whitepaper Blocks have metadata specifying high bandwidth requirements, accordingly, the storage controller moves the Video Blocks and the Whitepaper Blocks to Production Storage that has a high bandwidth capacity. As also discussed above, the Web Content Blocks have metadata specifying low bandwidth requirements, so the storage controller moves the Web Content Blocks to Production Storage having a lower bandwidth capacity.

In this manner, the storage controller may move the data to the appropriate servers without requiring the data to first be retrieved from the storage layer, recombined into files, and then provided to a client, where the client reviews the contents of the file in order to determine the appropriate action to perform. Rather, by encoding the context information directly into the blocks that are stored in the storage array, the technology enables the storage controller to perform actions on the blocks without requiring the content management system and/or the client to first retrieve the blocks from the storage array.

Figure 8:
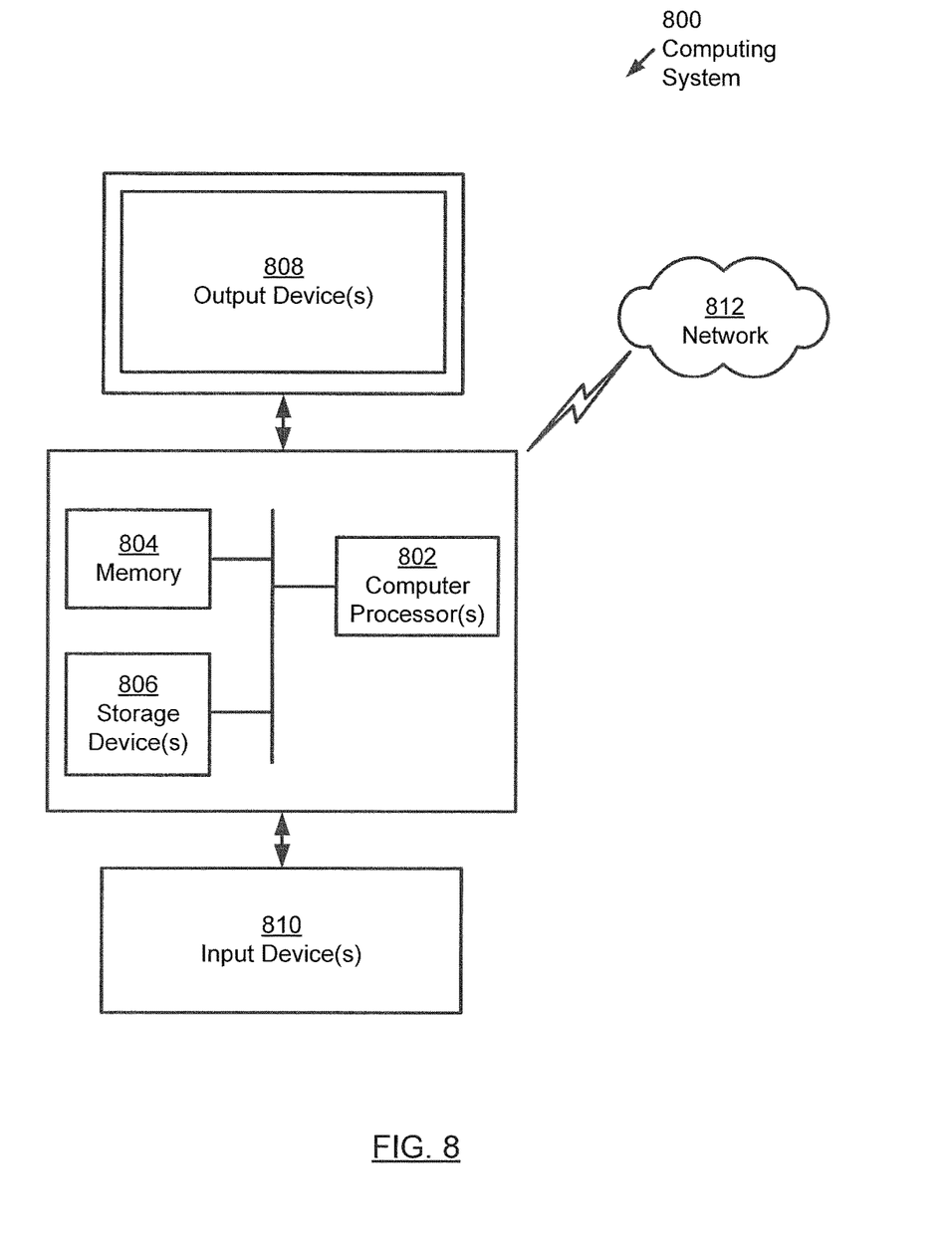
FIG. 8 shows a computing system in accordance with one or more embodiments of the technology.

FIG. 8 shows a computing system in accordance with one or more embodiments of the technology.

Embodiments of the technology may be implemented on a computing system. Any combination of mobile, desktop, server, embedded, or other types of hardware may be used. For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perfoiin embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (800) may be located at a remote location and connected to the other elements over a network (812). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for writing data, comprising:
   receiving a write request to store a file, wherein the write request comprises context information specifying at least a bandwidth priority;
   generating a metadata portion based on the context information;
   dividing the file into a plurality of data portions;
   generating a plurality of blocks wherein each of the plurality of blocks comprises the metadata portion and one of the plurality of data portions;
   determining at least one location in the storage array in which to store the plurality of blocks based, at least in part, on the context information, wherein the at least one location is one selected from a group consisting of a higher bandwidth location and a lower bandwidth location; and
   storing the plurality of blocks in a storage array at the at least one location.

2. The method of claim 1, wherein the write request is received from a client, wherein the context information is provided by the client.

3. The method of claim 1, wherein the write request is received from a content management service, wherein the context information is obtained from a client operatively connected to the content management service.

4. The method of claim 1, wherein the write request is received from a content management service, wherein context information comprises context information from the content management service and context information from a client operatively connected to the content management service.

5. The method of claim 1, wherein the metadata portion further comprises content metadata.

6. The method of claim 1, wherein generating the metadata portion based on the context information comprises encoding at least a portion of the context information to obtain context metadata, wherein the context metadata is stored in the metadata portion.

7. The method of claim 1, wherein the context information further specifies at least one selected from a group consisting of a data type, a security level, a historical data utilization, a predicated data utilization, encryption requirements, user information, read/write access levels, and a data shredding requirement.

8. A method for performing actions on blocks in a storage array, the method comprising:
   initiating, by a storage controller, a first action specifying first context information;
   identifying, by the storage controller, a first set of blocks in the storage array based on a matching of the first context information to first context metadata included in each block of the first set of blocks; and
   performing, by the storage controller, the first action to the first set of blocks,
   wherein the first context metadata specifies that each block in the first set of blocks has a high bandwidth priority,
   wherein performing the first action moves the first set of blocks from a first storage device in the storage array to a second storage device in the storage array,
   wherein the second storage device in the storage array is associated with a higher bandwidth.

9. The method of claim 8, wherein the first action is initiated upon receipt of a request from one selected from a group consisting of a client and a content management service.

10. The method of claim 9, wherein the content management service is a database.

11. The method of claim 8, wherein the method further comprises:
    initiating, by the storage controller, a second action specifying second context information;
    identifying, by the storage controller, a second set of blocks in the storage array based on a matching of the second context information to second context metadata included in each block of the second set of blocks; and
    performing, by the storage controller, the second action to the second set of blocks.

12. The method of claim 11, wherein the second context metadata included in each block of the second set of blocks specifies that each block in the second set of blocks is associated with an archived record, wherein performing the second action moves the second set of blocks from a third storage device in the storage array to a fourth storage device in the storage array, wherein the fourth storage device in the storage array is associated with a higher latency.

13. The method of claim 11, wherein the second context metadata included in each block of the second set of blocks specifies that each block in the second set of blocks is read-only, wherein the second action is a delete request, and wherein performing the second action comprises denying performance of the second action on the second set of blocks.

14. The method of claim 8, wherein the first action is initiated by the storage controller at predetermined intervals.

15. The method of claim 11, wherein the second action is a delete action.

16. A non-transitory computer readable medium comprising computer readable program code, which when executed by a computer processor enables the computer processor to:
    receive a write request to store a file, wherein the write request comprises context information specifying at least a bandwidth priority;
    generate a metadata portion based on the context information;
    divide the file into a plurality of data portions;

generate a plurality of blocks wherein each of the plurality of blocks comprises the metadata portion and one of the plurality of data portions;

determine at least one location in a storage array in which to store the plurality of blocks based, at least in part, on the context information, wherein the at least one location is one selected from a group consisting of a higher bandwidth location and a lower bandwidth location; and store the plurality of blocks in the storage array at the at least one location.

17. The non-transitory computer readable medium of claim 16, wherein the context information further specifies at least one selected from a group consisting of a data type, a security level, a historical data utilization, a predicated data utilization, encryption requirements, user information, read/write access levels, and a data shredding requirement.

18. The method of claim 11, wherein the second context information specifies at least one selected from a group consisting of a data type, a security level, a bandwidth priority, a historical data utilization, a predicated data utilization, encryption requirements, user information, read/write access levels, and a data shredding requirement.

19. The method of claim 11, wherein the second action results in digital shredding of at least one block in the second set of blocks.

* * * * *